United States Patent [19]
Kerner et al.

[11] Patent Number: 5,653,277
[45] Date of Patent: Aug. 5, 1997

[54] MOTOR VEHICLE WINDOW ROLLER BLIND

[75] Inventors: Wolfgang Kerner, Bondorf; Martin Wünsche, Althengstett, both of Germany

[73] Assignee: Mercedes-Benz AG, Germany

[21] Appl. No.: 521,732

[22] Filed: Aug. 31, 1995

[30] Foreign Application Priority Data

Sep. 1, 1994 [DE] Germany ............ 44 31 110.9

[51] Int. Cl.⁶ .................................... B60J 1/20
[52] U.S. Cl. ............... 160/370.22; 160/370.21; 160/264; 296/97.8
[58] Field of Search .............. 160/23.1, 84.02, 160/84.06, 262, 264, 265, 290.1, 370.21, 370.22, 370.23; 296/97.1, 97.8, 97.9

[56] References Cited

U.S. PATENT DOCUMENTS 5,036,898  8/1991  Chen .

FOREIGN PATENT DOCUMENTS

| | | |
|---|---|---|
| 0394123A1 | 10/1990 | European Pat. Off. . |
| 0404662A1 | 12/1990 | European Pat. Off. . |
| 8500424.3 | 2/1985 | Germany . |
| 3925801A1 | 2/1991 | Germany . |
| 9200437.7 | 3/1992 | Germany . |
| 4041341A1 | 6/1992 | Germany . |

*Primary Examiner*—Kenneth J. Dorner
*Assistant Examiner*—Bruce A. Lev
*Attorney, Agent, or Firm*—Evenson, McKeown, Edwards & Lenahan, P.L.L.C.

[57] ABSTRACT

In a roller blind for a front window of a motor vehicle, reinforcements are provided in order to reinforce the lateral border regions of a roller blind for a window of a motor vehicle. The end is provided with a thin reinforcement strip which runs transversely with respect to the movement direction of the roller-blind web is attached to the roller-blind web over the entire width thereof, and has a strip end which projects in a freely pivotable manner from the roller-blind web along a hinge axis which extends transversely over the width of the roller-blind web.

14 Claims, 2 Drawing Sheets

MOTOR VEHICLE WINDOW ROLLER BLIND

BACKGROUND AND SUMMARY OF THE INVENTION

The present invention relates to a roller blind for a window of a motor vehicle, and more particularly, to a roller blind for a front window having a roller-blind web which can be drawn out of a gap of a receiving housing and at the end of which a centrally arranged drawing-out aid is provided with reinforced free border regions arranged at the sides of the drawing-out aid.

DE 39 25 801 A1 discloses a window roller blind for a triangular side window of a motor vehicle. This blind has a roller-blind web which can be wound up onto a rotatably mounted bearing shaft and unwound therefrom. In order to prevent free border regions which are located outside the region where the roller-blind web is subjected to tensile stressing from falling in, at least one flexible reinforcement element is provided in the border regions. The reinforcement elements are connected to the roller-blind web by welding, adhesive bonding or the like. In particular metal or plastic wires are used as reinforcement elements.

DE 92 00 437 U1 shows a roller blind used as a sun visor for a front window of a motor vehicle. The roller-blind sheet is stored in a hollow of an instrument panel beneath the windscreen, with the hollow being covered by a lid. The instrument-panel opening, which permits access to the roller-blind sheet and can be covered by the lid, is relatively wide. In addition, in the case of curved instrument panels, high demands are to be made on the shaping of the lid.

An object of the present invention is to provide a roller blind which permits a very narrow gap in the receiving housing and, nevertheless, prevents the free border regions from falling in.

This object has been achieved in accordance with the present invention in that the end is provided with a thin reinforcement strip which runs transversely with respect to the movement direction of the roller-blind web, is attached to the roller-blind web, over the entire width thereof, and has a strip end which projects in a freely pivotable manner from the roller-blind web along a hinge axis which extends transversely over the width of the roller-blind web.

The solution according to the present invention prevents the free border regions from falling in even in the case of very wide roller blinds which extend over the entire width of a windscreen or of a rear window. By virtue of the narrow configuration of the roller-blind gap in the receiving housing, the latter can be integrated in an aesthetically pleasing manner into the interior of the motor vehicle. For example, the receiving housing can be accommodated in an instrument panel.

Because the loose strip end projects at an angle from the roller-blind web when the latter is drawn out, the hinge axis, which constitutes the bending line, forms a stable supporting axis over the entire width of the roller-blind web. Due to its dead weight, the loose strip end projects from the roller-blind web as soon as the roller blind is drawn out obliquely corresponding to an inclination of the associated window of the motor vehicle. The greater the inclination of the window, the greater then is the supporting action of the strip end which provides the roller-blind web with the highest degree of stability when it projects at an angle of approximately 90°. Inasmuch as the strip end hangs down loosely, when the roller-blind web is drawn back into the gap of the receiving housing, the strip end rests against the roller-blind web upon passing through the gap. As a result, a minimal stowage dimension of the roller blind is required.

In one embodiment of the present invention, the free border regions of the end of the roller-blind web taper obliquely, corresponding to the legs of an isosceles triangle, to the centrally arranged drawing-out aid. The hinge axis of the reinforcement strip is arranged at a distance from the drawing-out aid to form the hypotenuse of the isosceles triangle. This configuration makes it possible for all but the drawing-out aid of the roller-blind web to be drawn fully into the gap of the receiving housing, with the result that none of the roller blind is left protruding.

The reinforcement strip can have a curved longitudinal profile. This increases the bending stability of the reinforcement strip. In yet another embodiment of the present invention, the loose strip end of the reinforcement strip has a tongue which, when the roller-blind web is in the retracted state, projects out of the gap of the receiving housing. The reinforcement strip is thereby prevented from penetrating fully into the receiving housing when the roller-blind web is retracted. Jamming or tilting of the reinforcement strip in the receiving housing is thus avoided.

At least one retaining element can be provided to limit the pivot-out angle of the strip end relative to the roller-blind web to approximately 90°. By virtue of this retaining element, the reinforcement strip is always located approximately at right angles with respect to the roller-blind web when the latter is drawn out, as a result of which the hinge axis of the reinforcement strip provides the roller-blind web with an extremely high degree of support and stability.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
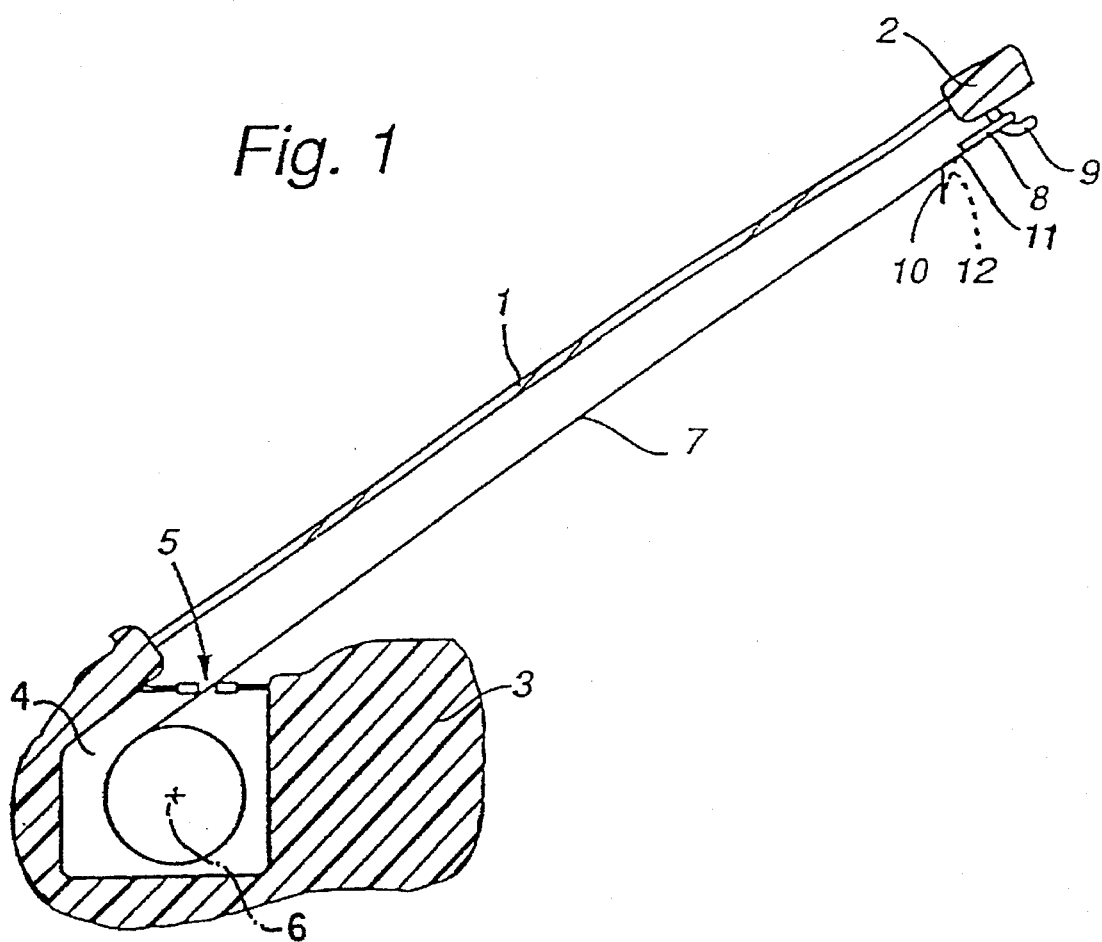
FIG. 1 is a longitudinal sectional view of an embodiment of a roller blind according to the present invention, in which the blind is mounted in the region of an instrument panel beneath a front window of a passenger car and can be drawn out obliquely upwards along the front window.

A front window 1 seen in FIG. 1 is arranged in a windscreen frame 2 in a passenger car. An instrument panel 3 is provided in the interior of the passenger car, beneath the front window 1 and has directly beneath the front window 1, a receiving space 4 which constitutes a receiving housing for a roller blind. The receiving space 4 extends transversely with respect to the direction of vehicle travel, over virtually the entire width of the front window 1. One roller blind can be, within the scope of the invention, arranged for the driver's side and the passenger side of the passenger car in the instrument panel beneath the front window so that the roller blinds can be drawn out separately. However, each of these two roller blinds corresponds to the embodiment which is further described hereinbelow.

Facing towards the front window 1, the receiving space 4 has an opening in the form of a narrow gap 5 which extends over the entire length of the receiving space 4, transversely with respect to the direction of travel. In the receiving space 4, a winding-up roller for a roller-blind web 7 is mounted to be rotated about an axis of rotation 6 running parallel to the longitudinal axis of the receiving space 4. Stored on the winding-up roller is a roller-blind web 7 which, in the retracted state, is drawn virtually fully into the receiving space 4 and, in the functional state, in which it serves as a sun visor for the front window 1, is drawn out obliquely upwards along an inner side of a front window 1 as far as the windscreen frame 2. The roller-blind web 7 consists of a sheet-like material and has a width which corresponds approximately to the length of the gap 5 of the receiving space 4.

Figure 2:
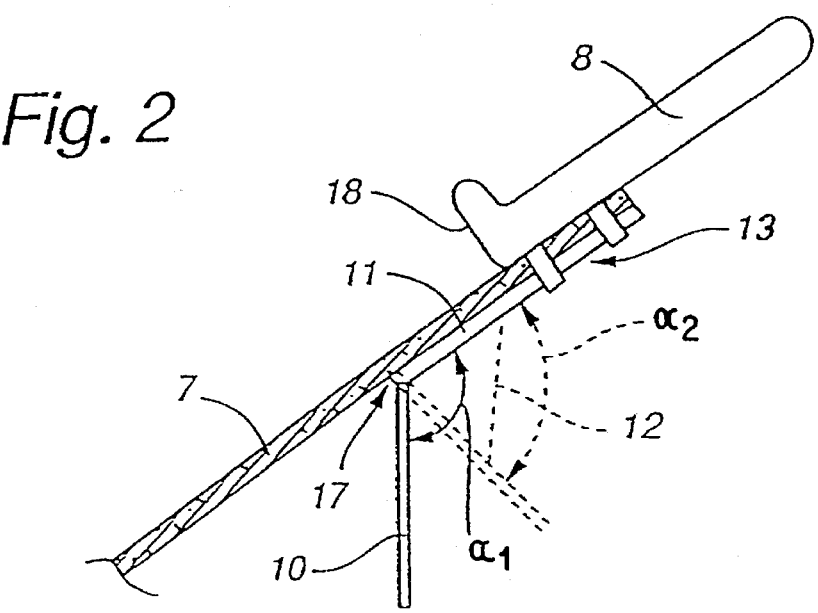
FIG. 2 is an enlarged, partial sectional view of an end of a roller-blind web of a roller blind according to FIG. 1, which is provided with a drawing-out aid in the form of a handle.
Figure 3:
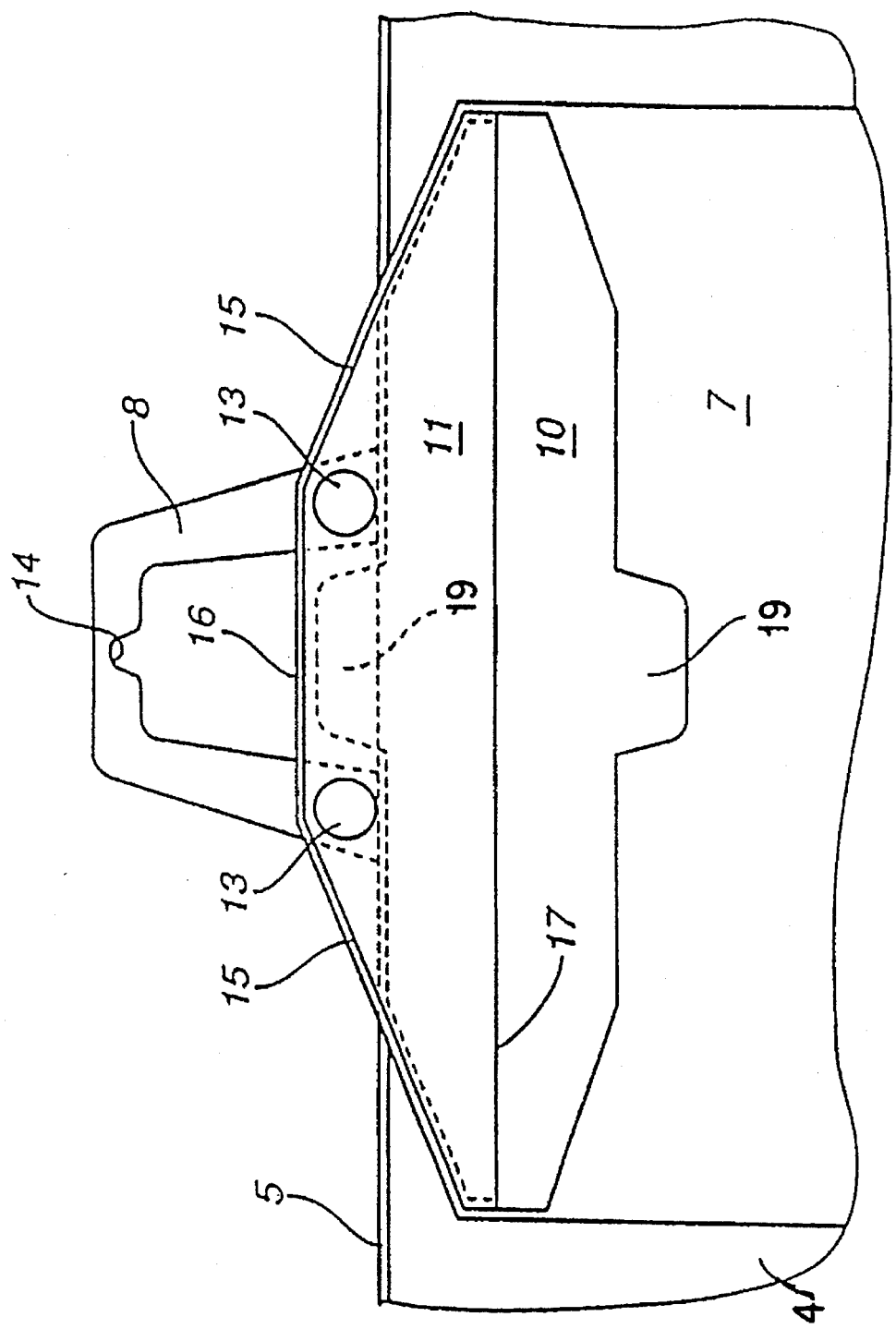
FIG. 3 is a schematic plan view of the roller blind drawn into the gap, the parts of the invention which are described in detail hereinbelow being represented on an enlarged scale.

The roller-blind web 7 projects through the gap 5 and exhibits, at its free end, has a handle 8 as seen in FIGS. 2 and 3. This handle 8 serves as a drawing-out aid and is fastened centrally on the roller-blind web 7 in the region of an end edge 16. In order to fasten the handle 8, two retaining rivets 13 project through corresponding openings in the roller-blind web 7. In each case one lateral border region 15 is provided at the end of the roller-blind web 7 on both sides of the end edge 16 running parallel to the axis of rotation 6 of the winding-up roller, as seen in FIG. 3, the two lateral border regions 15 tapering obliquely, corresponding to the legs of an isosceles triangle, to the end edge 16 and thus to the handle 8.

The handle 8 has a groove 14 so that when the roller-blind web 7 is in the drawn-out state, it can be fitted on a hook 9 in the region of the upper windscreen frame 2. The foot of the handle 8 has, in a region of the two ends of its U-shaped profile, a stop 18 which, when the roller-blind web 7 is in the retracted state, is supported on the border of the gap 5 on the upper side of the instrument panel 3 as seen in FIG. 3.

If the roller-blind web 7 were then to be drawn upwards manually, with the aid of the handle 8, along the inner side of the obliquely running front window 1 up to the hook 9, then the lateral border regions 15 not subjected to tensile loading by the handle 8 would fall inwards. To prevent this, a reinforcement strip in the form of a doubling of the sheet is provided in the region of the end of the roller-blind web 7. Alternatively, a thin sheetmetal strip can be used as the as the reinforcement strip.

In the illustrated embodiment, the sheet doubling is formed by an elastomeric sheet strip which is of increased strength by comparison with the material of the roller-blind web 7, but is only slightly thicker than the roller-blind web 7. The sheet strip exhibits two sub-strips 10, 11, which are subdivided by means of a bending line 17, which constitutes a hinge axis. The sheet strip 10, 11 extends over the entire width of the end of the roller-blind web 7 and is attached to the end of the roller-blind web 7 by its upper sub-strip 11. The sub-strip 11 constitutes an attachment strip.

In this arrangement, the upper sub-strip 11 is welded or adhesively bonded over its surface area to the end of the roller-blind web 7 as far as the bending line 17. The retaining rivets 13 of the handle 8 also take in the sub-strip 11. As a result, the sub-strip 11 has additional securing points provided by the retaining rivets. The lower sub-strip 10, arranged beneath the bending line 17, of the reinforcement strip 10, 11 projects, as a free strip end, from the bending line 17 such that it hangs down loosely. The bending line 17 thus forms a hinge which is a film hinge. A lower edge of the strip end 10 is cut out such that the strip end 10 can be swung over towards the end edge 16 such that it bears on the sub-strip 11, without it coming into contact with the retaining rivets 13. Moreover, a tongue 19 is provided on the lower edge of the strip end 10. When the strip end 10 has been folded towards the end edge 16, the tongue 19 projects in between the two retaining rivets 13 virtually as far as the end edge 16.

When the roller-blind web 7 is in the retracted state, the tongue 19 projects out of the gap 5 shown by broken lines in FIG. 3. Also, the sheet strip 10, 11 is folded, with the result that the reinforcement strip 10 bears on the sub-strip 11. In this folded state, the sheet strip 10, 11 exhibits its smallest possible stowage dimension. Consequently, the overall thickness of the roller blind in the region of its end is relatively small. For this reason, the gap 5 is of very small dimensions, and an aesthetically pleasing configuration of the instrument panel 3 is produced.

As soon as the roller-blind web 7 is drawn out upwards along the front window 1, the strip end 10, by virtue of its dead weight, swings downwards after having emerged from the gap 5 as seen in FIGS. 1 and 2. The strip end 10 pivots downwards relative to the roller-blind web 7 about the hinge axis of the hinge in the region of the bending line 17. Consequently, the strip end 10 is at an angle $\alpha_1$ with respect to the end of the roller-blind web 7 and forms a supporting angle over the entire width of the roller-blind web 7. By virtue of the angled alignment of the strip end 10, its upper end edge, along the bending line 17, constitutes a stable reinforcement axis, which prevents the lateral border region 15 from being able to fall inwards.

If the drawing-out aid provided on the end edge of the roller-blind web is not a handle 8, but for example, a drawing-out tongue, and the lateral border regions project transversely outwards in extension of the end edge, the reinforcement strip can be attached directly in the region of the end edge. Thereby, the hanging down reinforcement strip takes effect approximately level with the end edge of the roller-blind web.

The strip end 10 provides improved support for the lateral border regions 15 of the roller-blind web 7 when the strip end 10 is aligned at right angles with respect to the roller-blind web 7. However, because such virtually right-angled alignment of the strip end 10 takes place only when the front window 1 is virtually horizontal, provision is made, according to the broken lines in FIGS. 1 and 2, for a retaining band 12 arranged between the strips 10, 11 to limit the pivot-out movement of the strip end 10 to an angle $\alpha_2$ of approximately 90°.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A roller blind for a window of a motor vehicle, comprising a roller-blind web configured and arranged to be drawn out of a gap of a receiving housing; a centrally arranged drawing-out device provided at a free end of the web; and reinforced free border regions arranged laterally of the drawing-out device wherein the free end of the web is provided with a thin reinforcement strip which runs transversely to a movement direction of the web, is attached over an entire width of the web and has a strip end which projects in a freely pivotable manner from the web along a hinge axis which extends along the width of the web.

2. The roller blind according to claim 1, wherein the free border regions taper obliquely, corresponding to sides of an isosceles triangle, to the drawing-out device which is centrally arranged on the web, and the hinge axis of the reinforcement strip is arranged at a distance from the drawing-out device, such that it forms the hypotenuse of the isosceles triangle.

3. The roller blind according to claim 2, wherein the reinforcement strip comprises the strip end and an attachment strip connected over its surface area to the end of the roller-blind web.

4. The roller blind according to claim 1, wherein the reinforcement strip has a curved longitudinal profile.

5. A roller for a window of a motor vehicle, comprising a roller-blind web configured and arranged to be drawn out of a gap of a receiving housing; a centrally arranged drawing-out device provided at a free end of the web; and reinforced free border regions arranged laterally of the drawing-out device wherein the free end of the web is provided with a thin reinforcement strip which runs transversely to a movement direction of the web, is attached over an entire width of the web and has a strip end which projects in a freely pivotable manner from the web along a hinge axis which extends along the width of the web; and a retaining element connected between the reinforcement strip and the strip end.

6. The roller blind according to claim 5, wherein the hinge axis is a film hinge.

7. The roller blind according to claim 5, wherein the retaining element adhesively bonded or welded over a surface area thereof to the web.

8. The roller blind according to claim 5, wherein the strip end includes a tongue which, when the roller-blind web is in a retracted state, projects out of the gap of the receiving housing.

9. A roller blind for a window of a motor vehicle, comprising a roller-blind web configured and arranged to be drawn out of a gap of a receiving housing: a centrally arranged drawing-out device provided at a free end of the web; and reinforced free border regions arranged laterally of the drawing-out device wherein the free end of the web is provided with a thin reinforcement strip which runs transversely to a movement direction of the web, is attached over an entire width of the web and has a strip end which projects in a freely pivotable manner from the web along a hinge axis which extends along the width of the web, wherein at least one retaining element is provided in order to limit a pivot-out angle of the strip end relative to the roller-blind web to approximately 90°.

10. The roller blind according to claim 9, wherein the free border regions taper obliquely, corresponding to the legs of an isosceles triangle, to the drawing-out device which is centrally arranged on the web, and the hinge axis of the reinforcement strip is arranged at a distance from the drawing-out device, such that it forms the hypotenuse of the isosceles triangle.

11. The roller blind according to claim 10, wherein the reinforcement strip comprises the strip end and an attachment strip connected over its surface area to the end of the roller-blind web.

12. The roller blind according to claim 11, wherein the strip end includes a tongue which, when the roller-blind web is in a retracted state, projects out of the gap of the receiving housing.

13. The roller blind according to claim 12, wherein the hinge axis is a film hinge.

14. The roller blind according to claim 13, wherein the attachment strip is adhesively bonded or welded over a surface area thereof to the web.

* * * * *